(12) United States Patent
Tsuchiya et al.

(10) Patent No.: US 10,967,268 B2
(45) Date of Patent: Apr. 6, 2021

(54) INFORMATION PROCESSING APPARATUS

(71) Applicant: Sony Interactive Entertainment Inc., Tokyo (JP)

(72) Inventors: Akitsugu Tsuchiya, Kanagawa (JP); Yoshihiko Suwa, Kanagawa (JP); Tomohiro Ogawa, Kanagawa (JP)

(73) Assignee: Sony Interactive Entertainment Inc., Tokyo (JP)

( * ) Notice: Subject to any disclaimer, the term of this patent is extended or adjusted under 35 U.S.C. 154(b) by 240 days.

(21) Appl. No.: 15/547,741

(22) PCT Filed: Oct. 26, 2015

(86) PCT No.: PCT/JP2015/080103
§ 371 (c)(1),
(2) Date: Jul. 31, 2017

(87) PCT Pub. No.: WO2016/136026
PCT Pub. Date: Sep. 1, 2016

(65) Prior Publication Data
US 2018/0085671 A1    Mar. 29, 2018

(30) Foreign Application Priority Data

Feb. 27, 2015   (JP) .............................. JP2015-038350

(51) Int. Cl.
A63F 13/533     (2014.01)
A63F 13/79      (2014.01)
(Continued)

(52) U.S. Cl.
CPC .......... *A63F 13/533* (2014.09); *A63F 13/235* (2014.09); *A63F 13/42* (2014.09);
(Continued)

(58) Field of Classification Search
CPC ...... A63F 13/533; A63F 13/42; A63F 13/843; A63F 2300/1031; A63F 13/235;
(Continued)

(56) References Cited

U.S. PATENT DOCUMENTS 3,732,559 A * 5/1973 Eichelberger ............ G09G 1/20
345/24
4,295,831 A * 10/1981 Matt ................... G09B 19/0053
434/118
(Continued)

FOREIGN PATENT DOCUMENTS

CN    103632690 A    3/2014
CN    104298554 A    1/2015
(Continued)

OTHER PUBLICATIONS

Office Action for corresponding JP Application No. 2017-501839, 9 pages, dated Nov. 21, 2017.
(Continued)

*Primary Examiner* — Werner G Garner
(74) *Attorney, Agent, or Firm* — Matthew B. Dernier, Esq.

(57) ABSTRACT

An information processing apparatus is provided in which, if a plurality of users alternately use manipulation devices, who is to execute a manipulation input through which manipulation device can be guided in an easy-to-understand manner. An information processing apparatus connected with a plurality of manipulation devices to receive manipulation inputs from a plurality of users is configured to hold allocation information for allocating each of the plurality of manipulation devices to each of the plurality of users and display, on a screen of a display apparatus, a guide image including information for identifying a user before change and information for identifying a user after change if, in the (Continued)

allocation information, a user to whom any one of the plurality of manipulation devices is allocated is changed.

18 Claims, 6 Drawing Sheets

(51) Int. Cl.
    *A63F 13/235*     (2014.01)
    *A63F 13/48*     (2014.01)
    *A63F 13/42*     (2014.01)
    *G06F 3/01*     (2006.01)
    *A63F 13/843*     (2014.01)
    *H04N 1/00*     (2006.01)

(52) U.S. Cl.
    CPC .............. *A63F 13/48* (2014.09); *A63F 13/79* (2014.09); *A63F 13/843* (2014.09); *G06F 3/01* (2013.01); *A63F 2300/1031* (2013.01); *H04N 1/00416* (2013.01)

(58) Field of Classification Search
    CPC . A63F 13/48; A63F 13/79; G06F 3/01; H04N 1/00416
    See application file for complete search history.

(56) References Cited

U.S. PATENT DOCUMENTS

| | | | | |
|---|---|---|---|---|
| 4,862,151 | A * | 8/1989 | Grauz | G06F 3/037 178/18.01 |
| 7,744,466 | B2 | 6/2010 | Yoshinobu | |
| 9,101,825 | B2 | 8/2015 | Tanaka | |
| 9,498,722 | B2 | 11/2016 | Ishii | |
| 2004/0229687 | A1 | 11/2004 | Miyamoto | |
| 2007/0270217 | A1* | 11/2007 | Rabin | A63F 13/06 463/37 |
| 2008/0076498 | A1 | 3/2008 | Yoshinobu | |
| 2011/0009193 | A1* | 1/2011 | Bond | A63F 13/42 463/36 |
| 2012/0295707 | A1 | 11/2012 | Nonaka | |
| 2013/0252741 | A1* | 9/2013 | Ikenaga | A63F 13/12 463/42 |
| 2014/0274393 | A1 | 9/2014 | Ishii | |
| 2014/0295940 | A1 | 10/2014 | Tanaka | |
| 2014/0342818 | A1* | 11/2014 | Smith | G06F 3/015 463/29 |

FOREIGN PATENT DOCUMENTS

| | | |
|---|---|---|
| EP | 2065801 A1 | 6/2009 |
| EP | 2650038 A1 | 10/2013 |
| JP | 64008992 A | 1/1989 |
| JP | 08318049 A | 12/1996 |
| JP | 2004329744 A | 11/2004 |
| JP | 2005312655 A | 11/2005 |
| JP | 2008067731 A | 3/2008 |
| JP | 2013094386 A | 5/2013 |
| JP | 2014188052 A | 10/2014 |
| WO | 2011096352 A1 | 8/2011 |

OTHER PUBLICATIONS

International Search Report for corresponding PCT Application No. PCT/JP2015/080103, 4 pages, dated Jan. 19, 2016.

Momotaro Dentetsu X -Kyushu Hen mo Arubai-', Kaisetsusho, Hudson, Aug. 2, 2004 (Aug. 2, 2004) (received date), 40 pages (For relevancy see International Search Report for corresponding PCT Application No. PCT/JP2015/080103, 4 pages, dated Jan. 19, 2016 cited above).

International Preliminary Report on Patentability and Written Opinion for corresponding PCT Application No. PCT/JP2015/080103, 14 pages, dated Sep. 8, 2017.

Search Report for corresponding EP Application No. 15883316.0, 9 pages, dated Aug. 3, 2018.

Anonymous: "Hotseat (multiplayer mode) Wikipedia", Retrieved from the Internet Jul. 25, 2018: URL:https://en.wikipedia.org/w/index.php?title=Hotseat (multiplayer mode)&oldid=640482095 1 page (Jan. 1, 2015).

First Office Action for corresponding CN Application No. 201580076480.2, 17 pages, dated Mar. 16, 2020.

* cited by examiner

| USER ID | USER NAME | ICON IMAGE |
|---|---|---|
| USER U1 | James |  |
| USER U2 | Taro |  |
| USER U3 | Lisa |  |
| USER U4 | Hanako |  |

| DEVICE ID | TYPE | ALLOCATED USER |
|---|---|---|
| MANIPULATION DEVICE 14a | TYPE A | USER U1 |
| MANIPULATION DEVICE 14b | TYPE A | USER U2 |
| MANIPULATION DEVICE 14c | TYPE B | USER U1 |

INFORMATION PROCESSING APPARATUS

TECHNICAL FIELD

The present invention relates to an information processing apparatus that is manipulated for an input operation alternately by a plurality of users, a control method thereof, a control program thereof, and an information storage medium.

BACKGROUND ART

In playing a turn-based multiple-player participatory game for example, a plurality of users may alternately execute input operations on one information processing apparatus. In this case, if the number of manipulation devices connected to the information processing apparatus is smaller than the number of users, it is necessary that the plurality of users alternately use the manipulation devices. In such a situation, the information processing apparatus may display a guide which of the users is to execute a manipulation input next.

SUMMARY

Technical Problem

In the prior-art technology described above, especially if a plurality of manipulation devices are connected to an information processing apparatus, simply guiding which user is to execute a next manipulation input may be insufficient to make it clear who is to execute a manipulation input through which of the manipulation devices, thereby confusing the users.

Therefore, the present invention made in consideration of the problem described above provides as one of the objects an information processing apparatus configured, when a plurality of users alternately use manipulation devices, to guide who is to execute a manipulation input through which manipulation device in an easy-to-understand manner, a method of controlling this information processing apparatus, a program of controlling this information processing apparatus, and an information storage medium.

Solution to Problem

According to the present invention, there is provided an information processing apparatus connected with a plurality of manipulation devices to receive manipulation inputs from a plurality of users. The information processing apparatus includes a device management block configured to hold allocation information for allocating each of the plurality of manipulation devices to each of the plurality of users, and an allocation change notification block configured to display, on a screen of a display apparatus, a guide image including information for identifying a user before change and information for identifying a user after change if, in the allocation information, a user to whom any one of the plurality of manipulation devices is allocated is changed.

According to the present invention, there is provided a method of controlling an information processing apparatus connected with a plurality of manipulation devices to receive manipulation inputs from a plurality of users. The method includes a step of holding allocation information for allocating each of the plurality of manipulation devices to each of the plurality of users, and a step of displaying, on a screen of a display apparatus, a guide image including information for identifying a user before change and information for identifying a user after change if, in the allocation information, a user to whom any one of the plurality of manipulation devices is allocated is changed.

According to the present invention, there is provided a program for causing an information processing apparatus connected with a plurality of manipulation devices to receive manipulation inputs from a plurality of users to function as holding means for holding allocation information for allocating each of the plurality of manipulation devices to each of the plurality of users, and allocation change notification means for displaying, on a screen of a display apparatus, a guide image including information for identifying a user before change and information for identifying a user after change if, in the allocation information, a user to whom any one of the plurality of manipulation devices is allocated is changed. This program may be provided as stored in a computer-readable, non-temporary information storage medium.

DESCRIPTION OF EMBODIMENT

The following describes an embodiment of the present invention in detail with reference to the drawings.

Figure 1:
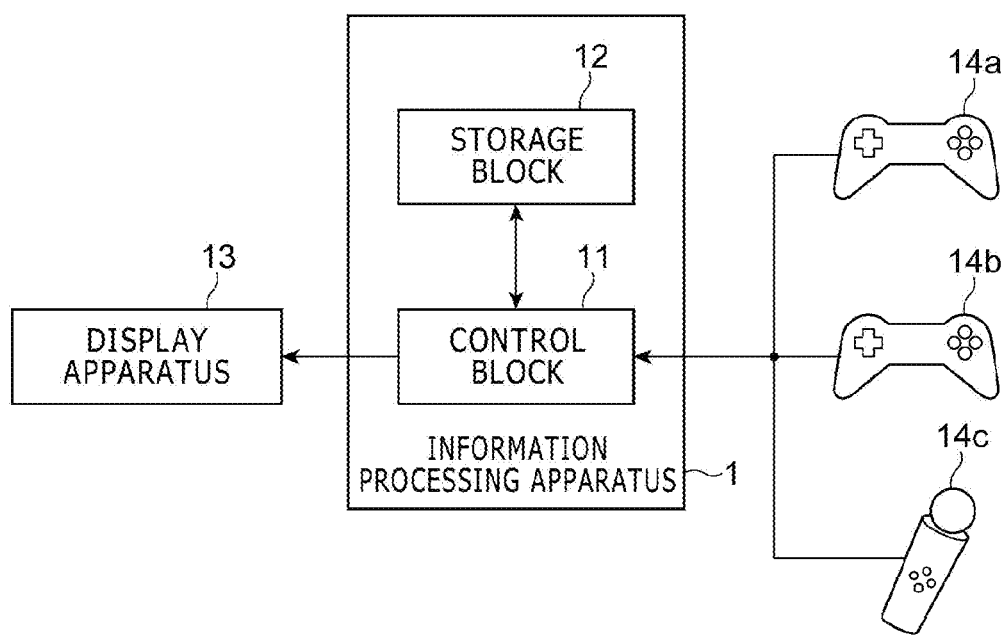
FIG. 1 is a configurational block diagram illustrating a configuration of an information processing apparatus related with one embodiment of the present invention.

Now, referring to FIG. 1, there is shown a configurational block diagram illustrating a configuration of an information processing apparatus 1 related with an embodiment of the present invention. The information processing apparatus 1 is a home game machine, a personal computer, or the like, for example and has a control block 11 and a storage block 12 as shown in FIG. 1. In addition, this information processing apparatus 1 is connected to a display apparatus 13 and a plurality of manipulation devices 14.

The control block 11 includes a central processing unit (CPU) and so on and executes various kinds of information processing by executing programs stored in the storage block 12. In the present embodiment, specific examples of the processing to be executed by the control block 11 will be described later. The storage block 12 includes a memory device such as a random access memory (RAM) and stores programs to be executed by the control block 11 and data to be processed by programs concerned.

The display apparatus 13 is a home television receiver, a liquid crystal display, or the like and displays on a screen thereof an image corresponding to a video signal input from the information processing apparatus 1. It should be noted that the display apparatus 13 may be built in a housing of the information processing apparatus 1 or may be a separate apparatus that is connected to the information processing apparatus 1 in a wired or wireless manner. Each of the manipulation devices 14 is a keyboard, a mouse, a home game machine controller, or the like for example and receives a manipulation input from a user. In the present embodiment, it is supposed that the plurality of manipulation devices 14 are each connected to the information processing apparatus 1 in a wired or wireless manner.

Figure 2:
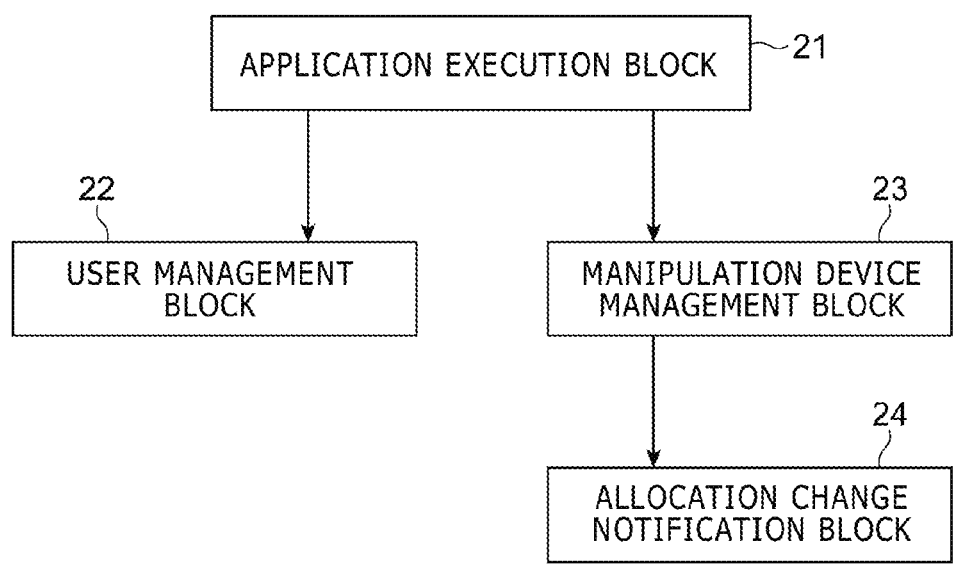
FIG. 2 is a functional block diagram illustrating functions of the information processing apparatus related with one embodiment of the present invention.

The following describes functions that are realized by the information processing apparatus 1 with reference to FIG. 2. As shown in FIG. 2, the information processing apparatus 1 functionally includes an application execution block 21, a user management block 22, a manipulation device management block 23, and an allocation change notification block 24. These functions are realized by the control block 11 operating in accordance with programs stored in the storage block 12. To be more specific, the application execution block 21 is realized by the control block 11 executing an application program. On the other hand, the user management block 22, the manipulation device management block 23, and the allocation change notification block 24 are realized by the control block 11 executing a control program included in a system software of the information processing apparatus 1. These programs may be provided to the information processing apparatus 1 via a communication network such as the Internet or as stored in a computer-readable information storage medium such as an optical disc.

The application execution block 21 realizes a function provided by an application program by executing this application program. Especially, in the present embodiment, the application execution block 21 executes the processing of receiving manipulation inputs from a plurality of users. In what follows, it is assumed that an application program of a turn-based game in which a plurality of users alternately execute manipulation inputs so as to play the game be executed by the application execution block 21, for a specific example. For turn-based games in which a plurality of users participate, a sugoroku game, a golf game, and so on are known.

Figure 3:
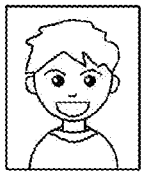
FIG. 3 is a diagram illustrating one example of a user management table.
Figure 3:
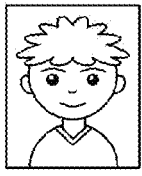
Figure 3:
Figure 3:
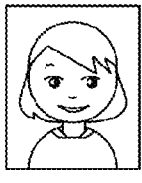

The user management block 22 manages the users who use the information processing apparatus 1. In the present embodiment, every user who uses the information processing apparatus 1 is supposed to make his or her registration in the information processing apparatus 1 in advance. The user management block 22 stores this user information in a user management table stored in the storage block 12. FIG. 3 shows a specific example of a user management table stored in the storage block 12. In this example of the diagram, four users U1 through U4 are registered in the information processing apparatus 1 and user identifications (IDs) for uniquely identifying these users, user names, and icon images representing these users are stored in the storage block 12 as related with each other. Each icon image is an image for user identification that has a predetermined size and is registered by each user or is selected by each user from among candidate images. Each user is able to register a photographic image of himself or herself as an icon image, for example.

Further, in starting the use of the information processing apparatus 1 by any one of the users, the user management block 22 checks who this user is. In what follows, this processing of confirming the user who uses the information processing apparatus 1 is referred to as login processing. To be more specific, the user management block 22 displays a login screen upon startup of the information processing apparatus 1 for example and makes a user who is now going to use the information processing apparatus 1 input information for identifying this user. Inputting the own user name or selecting the own user name from a displayed list of registered users, the user notifies the information processing apparatus 1 of the user who is now going to use the information processing apparatus 1. Consequently, the user management block 22 can hold the login user information indicative of the user who is currently using the information processing apparatus 1 (hereafter referred to as a login user).

Still further, in the present embodiment, the user management block 22 can execute the login processing of an additional user on demand from the application execution block 21. As described above, the application execution block 21 executes the processing of a game in which a plurality of users participate. Hence, in the execution of game processing by the application execution block 21, all users participating in the game must have logged in on the information processing apparatus 1. However, if all users who want to participate in a game must log in on the information processing apparatus 1 before starting up the application program, the application program must be ended once in a case where there is a user who forgot to log in or a case where it is desired halfway in the game to change participating users, thereby giving inconvenience to the users. Therefore, in the present embodiment, if a user adding request is received from the application execution block 21, the user management block 22 displays a login screen and executes the login processing for a user who participates in the game halfway. Then, if the user who participates halfway is successful in the login, the user management block 22 adds the information about the user who has newly logged in to the login user information. Consequently, even during the execution of an application program, the ex-post-facto login by a user who is going to use this application program is practicable. Thus, the application execution block 21 executes the processing of a game with a plurality of login users who logged in before or during the execution of an application program as the participants.

Figure 4A:
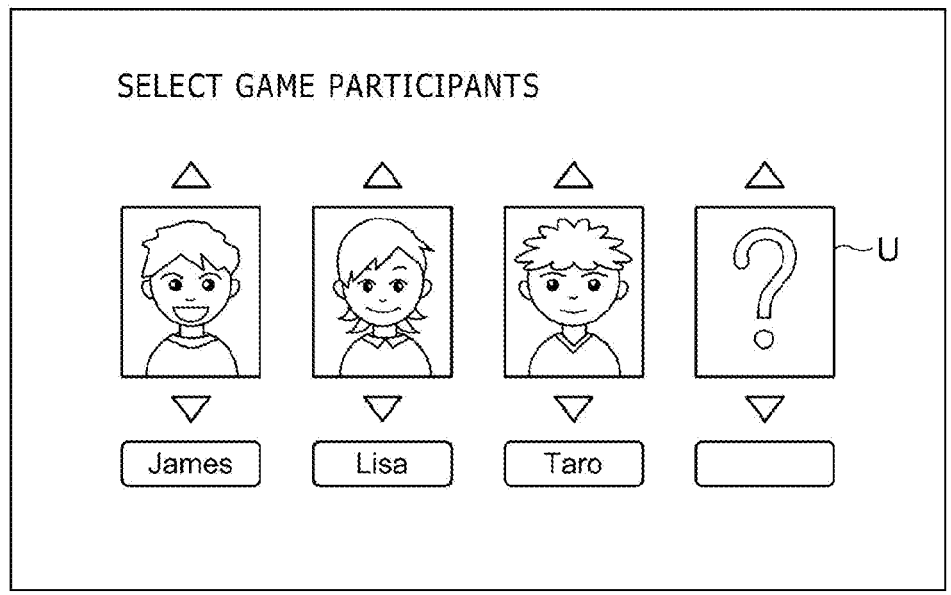
FIG. 4A is a diagram illustrating one example of a user select screen that is displayed by an application program.
Figure 4B:
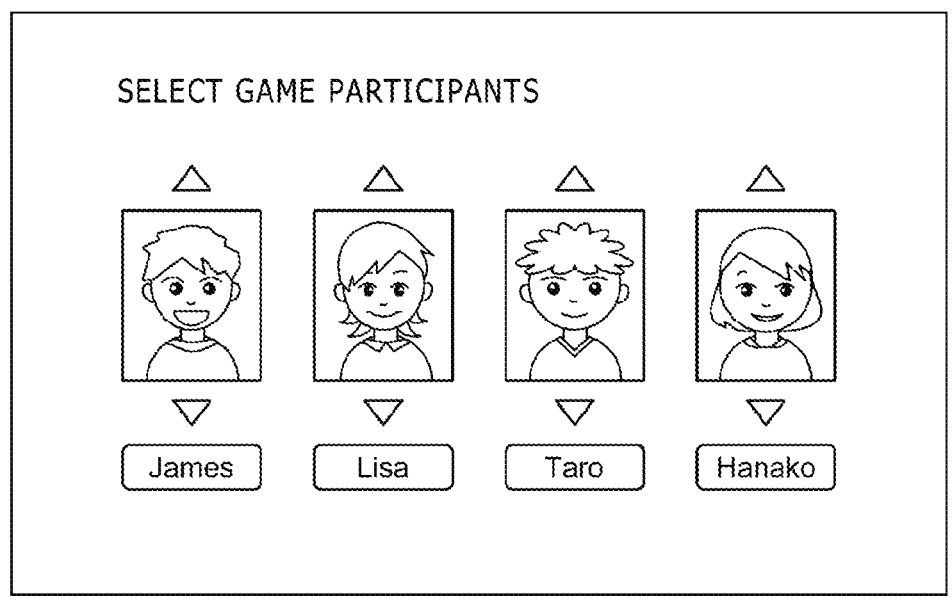
FIG. 4B is a diagram illustrating one example of a user select screen that is displayed by an application program.

FIG. 4A shows one example of a user select screen that is displayed by the application execution block 21. In this example of the diagram, the login users at that point of time are displayed as the candidates of game participation, from which the participants who actually play the game are selected. In addition, this user select screen shows a display column U indicative of a user who is not determined in entry; when this display column U is selected by a user, the application execution block 21 requests the user management block 22 for adding a user. Receiving this request, the user management block 22 displays a login screen to receive the login by a new user. When the new user logs in, the application execution block 21 newly displays a user select screen with the new login user included in the participation candidates (FIG. 4B). It should be noted that, if the number of login users is upper-limited and a new user tries to log in in excess of the upper limit, then the user management block 22 may select the login user who logged in first and make this login user log out. Alternatively, a user to be logged out may be selected by a user.

Figures 5, 6A:
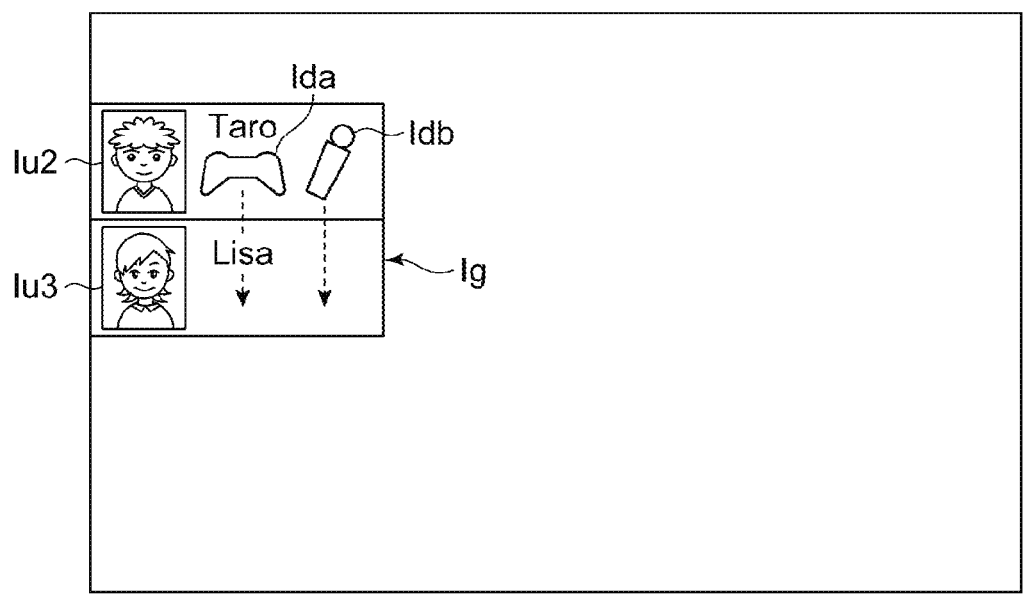
FIG. 5 is a diagram illustrating one example of an allocation management table.
FIG. 6A is a diagram illustrating one example of a screen for notifying a change in manipulation device allocation at the time of starting the display.

The manipulation device management block 23 manages the information about the manipulation device 14 connected to the information processing apparatus 1. Especially, in the present embodiment, a plurality of manipulation devices 14 are connected to the information processing apparatus 1. The manipulation device management block 23 manages the allocation information indicative of who uses which manipulation device 14 (namely, to which user each manipulation device 14 is allocated). To be more specific, the manipulation device management block 23 stores an allocation management table as illustrated in FIG. 5 in the storage block 12 for the manipulation devices 14 connected to the information processing apparatus 1. FIG. 5 shows a specific example of an allocation management table indicative of the allocation information of the manipulation devices 14. It should be noted that the information processing apparatus 1 is configured for the connection with a plurality of types of manipulation devices 14 and the manipulation device management block 23 also manages the types of the connected manipulation devices 14. To be more specific, in the example shown in FIG. 5, for the device ID for identifying each manipulation device 14, the information indicative of the type of the manipulation device 14 concerned and the user ID of a user allocated with the manipulation device 14 concerned are stored as related with each other. In this example of the diagram, a total of three manipulation devices 14, manipulation devices 14a and 14b of type A and a manipulation device 14c of type B are connected to the information processing apparatus 1 and the manipulation devices 14a and 14c are allocated to a user U1 and the manipulation device 14b is allocated to a user U2. It should be noted that a user to whom a manipulation device 14 is allocated in an initial state may be a user selected when that manipulation device 14 is first connected to the information processing apparatus 1.

The application execution block 21 outputs an allocation request to the manipulation device management block 23 for the allocation of a manipulation device 14 to any one of the login users as a game progresses. To be more specific, assume that four users U1 through U4 participate in a game by logging in on the information processing apparatus 1 and the user U1, the user U2, the user U3, and the user U4 alternately execute manipulation inputs in this sequence. Also assume that, when each user executes a manipulation input, both the manipulation device 14 of type A and the manipulation device 14 of type B be used. In this case, first, at the time when the user U1 is to execute a manipulation input, the application execution block 21 requests for the allocation of the manipulation devices 14 of type A and type B to the user U1. This allocation request specifies the user to whom the allocation is executed (namely, the user who is to execute a manipulation input next) and the type of the manipulation device 14 to be allocated to that user.

Receiving this allocation request, the manipulation device management block 23 determines whether or not the transfer of the manipulation device 14 between users is necessary. To be more specific, the manipulation device management block 23 determines whether or not the manipulation device 14 of the type specified by the allocation request has already been allocated to the user U1 who is the target of allocation. If it is determined that a manipulation device 14 of a type specified but not allocated is found, an allocation change is executed in which the manipulation device 14 of the type concerned allocated to another user is newly allocated to the user U1 who is the target of allocation. In the example shown in FIG. 5, since the manipulation device 14a of type A and the manipulation device 14c of type B have already been allocated to the user U1, the manipulation device management block 23 determines that there is no need for allocation change.

When the user U1 ends the manipulation input, it is the user U2's turn next. The application execution block 21 then sets the user U2 as the target of allocation and specifies the manipulation devices 14 of type A and type B, thereby executing a next allocation request. This time, the manipulation device 14b of type A is allocated to the user U2, but the manipulation device 14c of type B is not allocated to the user U2. Therefore, the manipulation device management block 23 newly allocates the manipulation device 14c currently allocated to the user U1 to the user U2. Thus, if an allocation change of a manipulation device 14 is executed, the manipulation device management block 23 updates the allocation management table such that the allocation change results are reflected. Then, the manipulation device management block 23 notifies the allocation change notification block 24 that an allocation change is made. Receiving this, the allocation change notification block 24 notifies the users of the occurrence of an allocation change. It should be note that a specific example of an allocation change notification from the allocation change notification block 24 will be described later. Receiving this allocation change notification, the user U1 passes the manipulation device 14c of type B used by himself or herself to the user U2. Consequently, the user U2 is able to execute manipulation inputs by use of the manipulation device 14c of type B received from the user U1 and the manipulation device 14b of type A owned from the beginning.

Next, when the user U3 executes a manipulation input, the application execution block 21 executes an allocation request targeting the user U3 in the same manner as described above. At this stage, since there is no manipulation device 14 allocated to the user U3, the manipulation device management block 23 executes an allocation change from another user to the user U3 for both the manipulation device 14 of type A and the manipulation device 14 of type B specified by the allocation request. To be more specific, assume that the manipulation device management block 23 newly allocates both the manipulation device 14b of type A and the manipulation device 14c of type B which has been used by the user U2 to the user U3, for example. Likewise, when the user U4 executes a manipulation input, an allocation change of the manipulation devices 14 of two types may be executed from the user U3 to the user U4. Further, if the user U1 subsequently executes a manipulation input again, the application execution block 21 executes an allocation request targeting the user U1 in the same manner as described above. However, since the manipulation device 14a of type A has already been allocated to the user U1, the manipulation device management block 23 executes an allocation change from the user U4 to the user U1 only for the manipulation device 14c of type B.

As clearly seen from the description made above, the application execution block 21 sequentially executes allocation requests as the processing progresses by specifying only the user who is to execute a manipulation input next and the type of a manipulation device 14 necessary for the next manipulation input; therefore, it is not necessary to specify, as an allocation target, which of the manipulation devices 14 or a manipulation device 14 used by whom. Hence, it is not necessary for the application execution block 21 to take into consideration that which of the manipulation devices 14 is allocated to whom at the time of executing each allocation request; therefore the application execution block 21 has only to specify a user who is to execute a next manipulation input and the type of a manipulation device 14. Receiving this, the manipulation device management block 23 refers to the allocation management table and determines the type of the manipulation device 14 to be transferred and from whom to whom the transfer is to be performed. Consequently, even if all of the users participating in a game do not have the manipulation devices 14 of the types necessary for the execution of manipulation inputs, each user is able to execute necessary manipulation inputs by sequentially transferring the manipulation devices 14.

It should be noted that the manipulation device management block 23 that received an allocation request from the application execution block 21 may notify the application execution block 21 of the device ID of the manipulation device 14 allocated in accordance with the request after the execution of allocation processing. Consequently, the application execution block 21 can handle an input from the manipulation device 14 identified by the notified device ID as a manipulation input from the user specified at the time of request and execute the processing. Alternatively, the application execution block 21 may refer to the allocation management table to identify the user who executed the manipulation input. In this case, the manipulation device management block 23 need not notify the application execution block 21 of the execution results of the allocation processing.

When the manipulation device management block 23 has changed the allocation of a manipulation device 14, the allocation change notification block 24 notifies the users thereof. To be more specific, the allocation change notification block 24 displays, for a manipulation device 14 targeted for allocation change, a guide image that includes information for identifying the user before change (a user having the target manipulation device 14 at that point of time) and information for identifying the user after change (a user who is to execute a manipulation input next) on the screen of the display apparatus 13. Consequently, the allocation change notification block 24 can notify the users from whom to whom the manipulation device 14 is to be transferred. In addition, at the same time, the allocation change notification block 24 displays information for identifying the type of the manipulation device 14 to be transferred. Consequently, the users can get to know which type of manipulation device 14 is to be transferred from whom to whom.

Figure 6B:
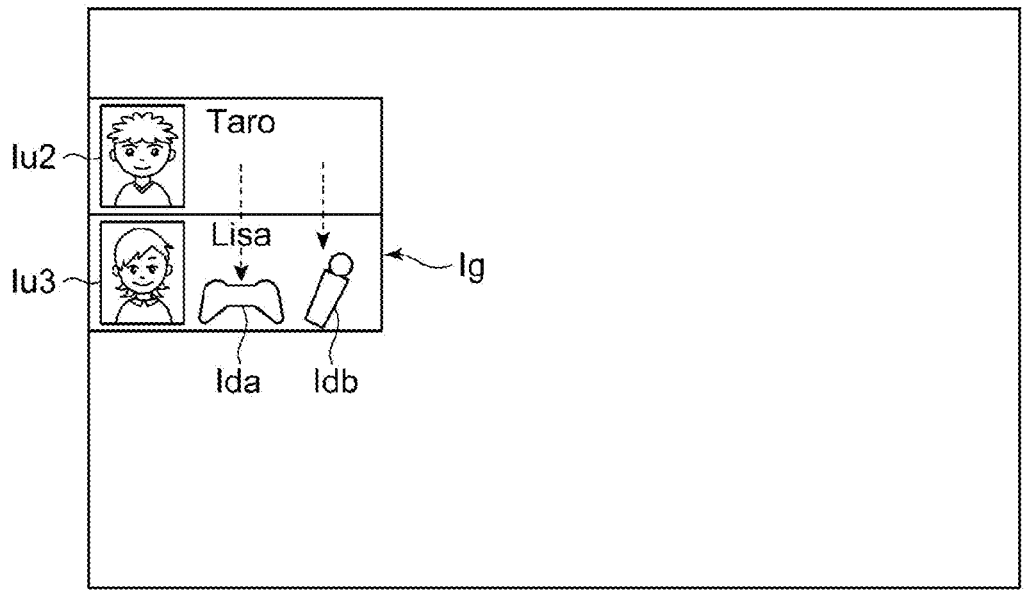
FIG. 6B is a diagram illustrating one example of a screen for notifying a change in manipulation device allocation at the time of ending the display.

FIG. 6A and FIG. 6B illustrate examples of a guide image Ig that is displayed by the allocation change notification block 24 on the screen of the display apparatus 13 for notifying an allocation change. In the examples, the guide images Ig are shown for a case in which both the manipulation device 14b of type A and the manipulation device 14c of type B are transferred from the user U2 to the user U3. FIG. 6A shows the contents that are displayed at the time of starting the notification and FIG. 6B shows the contents that are displayed at the time of ending the notification. Each diagram shows an icon image Iu2 indicative of the user U2, an icon image Iu3 indicative of the user U3, a device image Ida indicative of a manipulation device 14 of type A, and a device image Idb indicative of a manipulation device 14 of type B. Here, the guide image Ig may be displayed as superimposed on a game screen that is displayed by the application execution block 21. It should be noted that an icon image Iu of each user is an image stored by the user management block 22 into the user management table and each device image Id is an image representing the shape of the manipulation device 14 of the corresponding type. Arrows of dashed lines in these diagrams are indicative of moving routes of the manipulation device images Ida and Idb at the time when the allocation change notification block 24 gives a notification. Displaying a manner in which the manipulation device images Ib1 and Ib2 move along the routes indicated by the arrows in a moving image allows the user U2 to understand that the manipulation devices 14 of two types owned by himself or herself are to be transferred to the user U3.

Figure 7:
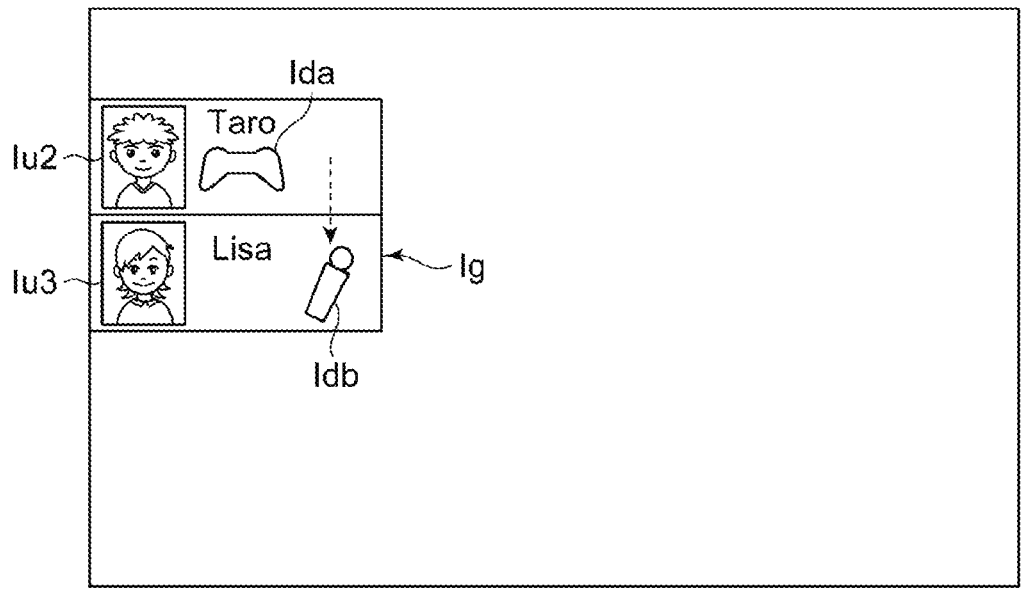
FIG. 7 is a diagram illustrating another example of a screen for notifying a change in manipulation device allocation.

It should be noted that if a user has the manipulation devices 14 of a plurality of types and only the allocation of some of the manipulation devices 14 is changed to another user, the allocation change notification block 24 may display only the device image Id indicative of the manipulation device 14 of the type of which allocation has been changed. Alternatively, the allocation change notification block 24 may display the device images Id indicative of all manipulation devices 14 allocated to the user before change and move only the device image Id indicative of the manipulation device 14 of which allocation is changed from a position corresponding to the user before change to a position corresponding to the user after change. FIG. 7 illustrates a display example of this case. To be more specific, this diagram is a display example in a case in which the manipulation device 14b of type A and the manipulation device 14c of type B are allocated to the user U2 and only the allocation of the manipulation device 14c of type B is changed to the user U3. In this example, the display starts with the state shown in FIG. 6A and ends with the state shown in FIG. 7. Further, an arrow of dashed line shown in FIG. 7 is indicative of a moving route of the device image Idb. According to the display such as above, it is clear that, of the manipulation devices 14 owned by the user U2, the user U2 may pass only the manipulation device 14c of type B to the user U3.

Figure 8:
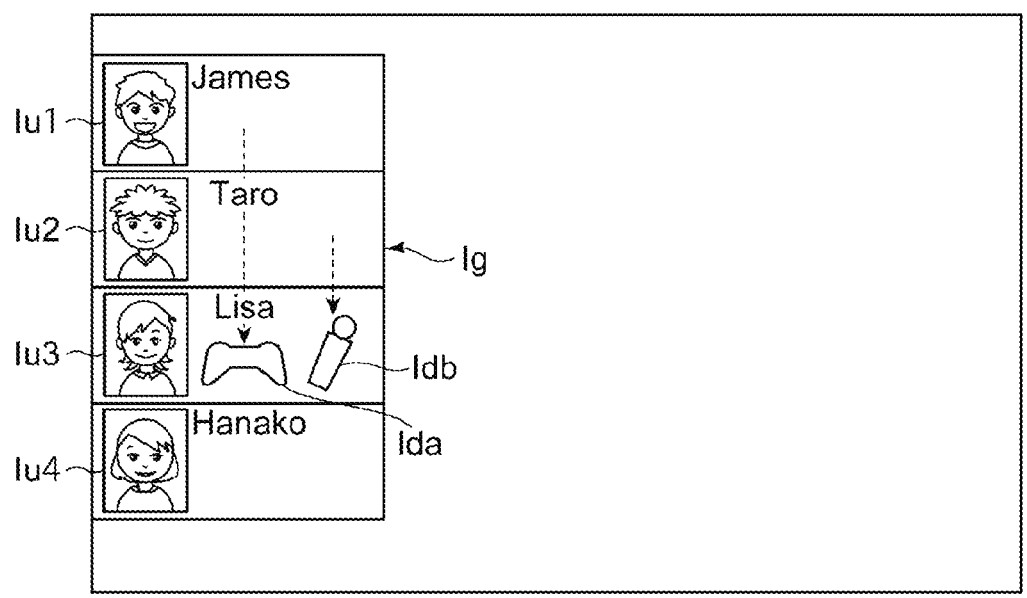
FIG. 8 is a diagram illustrating still another example of a screen for notifying a change in manipulation device allocation.

There may be also a case in which it is necessary to perform the transfer of manipulation devices 14 by combinations of a plurality of users at a time. For example, there is a case in which the allocation of a manipulation device 14 of type A is changed from the user U1 to the user U3 and the allocation of a manipulation device 14 of type B is changed from the user U2 to the user U3. In this case, the allocation change notification block 24 may display a guide image for simultaneously indicating a plurality of allocation changes or sequentially display the allocation changes one by one. In a specific example of a guide image for simultaneously indicating a plurality of allocation changes, the allocation change notification block 24 displays a list of user images Iu indicative of all participating users. Then, for each of the plurality of manipulation devices 14 of which allocation is to be changed, the allocation change notification block 24 first displays a device image Id indicative of the manipulation device 14 concerned at a position corresponding to the user before change and then displays a moving image indicative of a manner in which the device image Id moves from that position to a position corresponding to the user after change. FIG. 8 shows a display example of this case. In this example, icon images Iu1 through Iu4 indicative of the users U1 through U4 are displayed, and a manner is displayed in which the device image Ida indicative of a manipulation device 14 of type A moves from a position corresponding to the user U1 to a position corresponding to the user U3 and at the same time the device image Idb indicative of a manipulation device 14 of type B moves from a position corresponding to the user U2 to the position corresponding to the user U3.

Further, in the description above, the device image Id indicative of a manipulation device 14 of which allocation is to be changed is displayed as moving from the position corresponding to the user before change to the position corresponding to the user after change; however, the allocation change notification block 24 may give a notification of allocation change in other methods. For example, the allocation change notification block 24 may first display an image Iu indicative of the user before change along with the device image Id indicative of the manipulation device 14 of the type of which allocation is to be changed and then display a manner in which the image Iu indicative of the user before change changes to an image Iu indicative of the user after change. Such a display can also give a notification that a manipulation device 14 is to be passed from the user before change to the user after change.

According to the information processing apparatus 1 related with the present embodiment described above, when manipulation devices 14 of a plurality of types are alternately used by a plurality of users for executing manipulation inputs, clear guidance can be presented regarding from whom to whom manipulation devices 14 are to be passed.

It should be noted that the embodiment of the present invention is not limited to that described above. For example, in the description above, it is assumed that the application execution block 21 executes the processing related with a turn-based game and one person executes a manipulation input at a time. However, the present invention is not limited to this; for example, manipulation devices 14 may be used by two or more persons at a time as with the repetitive execution of a competition-based game by changing combinations. In this case, the application execution block 21 may execute an allocation request by specifying a plurality of users who newly participate in a competition and the type of a manipulation device 14 to be used by each user every time the combination of competition is changed. In addition to games, the application execution block 21 may execute application programs of other types in which a plurality of users sequentially execute manipulation inputs.

REFERENCE SIGNS LIST

1 Information processing apparatus, 11 Control block, 12 Storage block, 13 Display apparatus, 14 Manipulation device, 21 Application execution block, 22 User management block, 23 Manipulation device management block, 24 Allocation change notification block

The invention claimed is:

1. An information processing apparatus connected with a plurality of manipulation devices to receive manipulation inputs from a plurality of users during a game, the information processing apparatus comprising:
a device management block configured to hold allocation information for allocating each of the plurality of manipulation devices to each of the plurality of users;
an allocation change notification block configured to display, on a screen of a display apparatus, a guide image including information for notifying the plurality of users of an allocation change during the game, wherein the guide image displays an image of a first user, an image of a second user, and an image of each manipulation device controlled by the first user which is to be allocated to the second user along with arrows indicative of moving routes of each manipulation device to be allocated;
an application execution block configured to process a game in which the plurality of users participate and further configured to output an allocation change request to the device management block for the allocation change as the game progresses, wherein the allocation change request specifies the first user and a type of each manipulation device controlled by the first user to allocate from the first user to the second user, wherein the type of manipulation device displayed depends on the type of input required in the game at the time of the allocation change request;
a user management block configured to manage the plurality of users, wherein the second user is a late participant who logs into the game after the game has started.

2. The information processing apparatus according to claim 1, wherein
the information processing apparatus is connected with the plurality of manipulation devices of a plurality of types, and
the image of each manipulation device to be allocated shows the shape thereof.

3. The information processing apparatus according to claim 1,
wherein the application execution block outputs the allocation change request to the device management block, the allocation change request specifying a user who is to next use a manipulation device among the plurality of users, and
the device management block updates the allocation information such that the specified user is allocated with any one of the plurality of manipulation devices.

4. The information processing apparatus according to claim 3, wherein
the user management block is configured to hold login user information indicative of a user who is using the information processing apparatus,
wherein the user management block adds information indicative of a new user to the login user information in accordance with a request by the application execution block, and
the application execution block outputs the allocation change request by specifying any one of the plurality of users included in the login user information.

5. The information processing apparatus according to claim 1, wherein the device management block stores an allocation management table for the plurality of manipulation devices.

6. The information processing apparatus according to claim 5, wherein the allocation management table includes the type of manipulation device allocated to each user and a user ID for each user to whom one of the plurality of manipulation devices was allocated.

7. The information processing apparatus according to claim 6, wherein the type of manipulation device is selected from the group consisting of: a keyboard, a mouse, and a game controller.

8. The information processing apparatus according to claim 7, wherein the allocation management table indicates that a different type of manipulation device is allocated to another of the plurality of users.

9. The information processing apparatus according to claim 8, wherein when allocation of one of the plurality of manipulation devices is changed, the allocation management table information is automatically updated to reflect that change.

10. The information processing apparatus according to claim 1, wherein the allocation change request specifies a plurality of different types of manipulation devices to allocate to a single user.

11. The information processing apparatus according to claim 1, wherein the application execution block executes allocation change requests by specifying only the user who is to execute a manipulation input next and the type of a manipulation device necessary for the next manipulation input.

12. The information processing apparatus according to claim 1, wherein the guide image is displayed as superimposed on a game screen that is displayed by the application execution block.

13. The information processing apparatus according to claim 1, wherein the guide image simultaneously displays a plurality of allocation changes to be made.

14. The information processing apparatus according to claim 1, wherein the game is a turn-based game.

15. The information processing apparatus according to claim 1, wherein the guide image displays an image of a third user, and an image of each manipulation device controlled by the first user and the second user which are to be allocated to the third user.

16. A method of controlling an information processing apparatus connected with a plurality of manipulation devices to receive manipulation inputs from a plurality of users during a game, the method comprising:
holding allocation information for allocating each of the plurality of manipulation devices to each of the plurality of users;
displaying, on a screen of a display apparatus, a guide image including information for notifying the plurality of users of an allocation change during the game, wherein the guide image displays an image of a first user, an image of a second user, and an image of each manipulation device controlled by the first user which is to be allocated to the second user along with arrows indicative of moving routes of each manipulation device to be allocated; and
executing a program for a game in which the plurality of users participate and output an allocation change request as the game progresses, wherein the allocation change request specifies the first user and a type of each manipulation device controlled by the first user to allocate from the first user to the second user, wherein the type of manipulation device displayed depends on the type of input required in the game at the time of the allocation change request,
wherein the second user is a late participant who logs into the game after the game has started.

17. A non-transitory, computer readable storage medium containing a computer program, which when executed by a computer, causes the computer to implement an information processing apparatus, the information processing apparatus connected with a plurality of manipulation devices to receive manipulation inputs from a plurality of users during a game, the computer program causing the computer to carry out actions, comprising:
holding allocation information for allocating each of the plurality of manipulation devices to each of the plurality of users;
displaying, on a screen of a display apparatus, a guide image including information for notifying the plurality of users of an allocation change during the game, wherein the guide image displays an image of a first user, an image of a second user, and an image of each manipulation device controlled by the first user which is to be allocated to the second user along with arrows indicative of moving routes of each manipulation device to be allocated;
executing a game program in which the plurality of users participate and output an allocation change request as the game progresses, wherein the allocation change request specifies the first user and a type of each manipulation device controlled by the first user to allocate from the first user to the second user, wherein the type of manipulation device displayed depends on the type of input required in the game at the time of the allocation change request,
wherein the second user is a late participant who logs into the game after the game has started.

18. An information processing apparatus connected with a plurality of manipulation devices to receive manipulation inputs from a plurality of users during a game, the information processing apparatus including a computer executing a computer program such that the computer program causes the computer to carry out actions, comprising:
holding allocation information for allocating each of the plurality of manipulation devices to each of the plurality of users;
displaying, on a screen of a display apparatus, a guide image including information for notifying the plurality of users of an allocation change during the game, wherein the guide image displays an image of a first user, an image of a second user, and an image of each manipulation device controlled by the first user which is to be allocated to the second user along with arrows indicative of moving routes of each manipulation device to be allocated; and
executing a game program in which the plurality of users participate and output a request for the allocation change as the game progresses, wherein the allocation change request specifies the first user and a type of each manipulation device controlled by the first user to allocate from the first user to the second user, wherein the type of manipulation device displayed depends on the type of input required in the game at the time of the allocation change request,
wherein the second user is a late participant who logs into the game after the game has started.

* * * * *